United States Patent [19]

Gill

[11] Patent Number: 4,510,881
[45] Date of Patent: Apr. 16, 1985

[54] MARINE PROPULSION UNIT
[75] Inventor: John D. Gill, Edgewater, Md.
[73] Assignee: Ex-Cell-O Corporation, Troy, Mich.
[21] Appl. No.: 519,426
[22] Filed: Aug. 1, 1983
[51] Int. Cl.³ .............................................. B63B 35/00
[52] U.S. Cl. ..................................... 114/270; 440/11; 180/53.6
[58] Field of Search ....................... 114/270; 440/3, 11, 440/75, 900, 100; 180/53.6, 53.61, 53.62

[56] References Cited

U.S. PATENT DOCUMENTS

| | | | |
|---|---|---|---|
| 2,278,215 | 3/1942 | Poche | 114/270 |
| 2,336,906 | 12/1943 | West | 114/270 |
| 3,418,960 | 12/1968 | Nelson | 114/270 |

FOREIGN PATENT DOCUMENTS 432120  7/1935  United Kingdom .................. 440/11

Primary Examiner—Trygve M. Blix
Assistant Examiner—Jesús D. Sotelo
Attorney, Agent, or Firm—John C. Evans

[57] ABSTRACT

An amphibious vehicle has an engine and a drive train connected to drive wheels with tires having a tread configuration that produces a water propulsion effect when the vehicle is driven through water. An auxiliary propulsion unit is selectively positioned in driving relationship to each of the wheels to improve water speed of the vehicle. The propulsion unit includes a gear box with its input connected to the wheel hub; its output connected to a propeller and an anti-torque strut is pivotally connected to the gear box and anchored to the vehicle hull whereby the propeller speed is increased by the gear box a desired amount as compared to axle speed to rotate the propeller at a speed to propel the amphibious vehicle.

8 Claims, 4 Drawing Figures

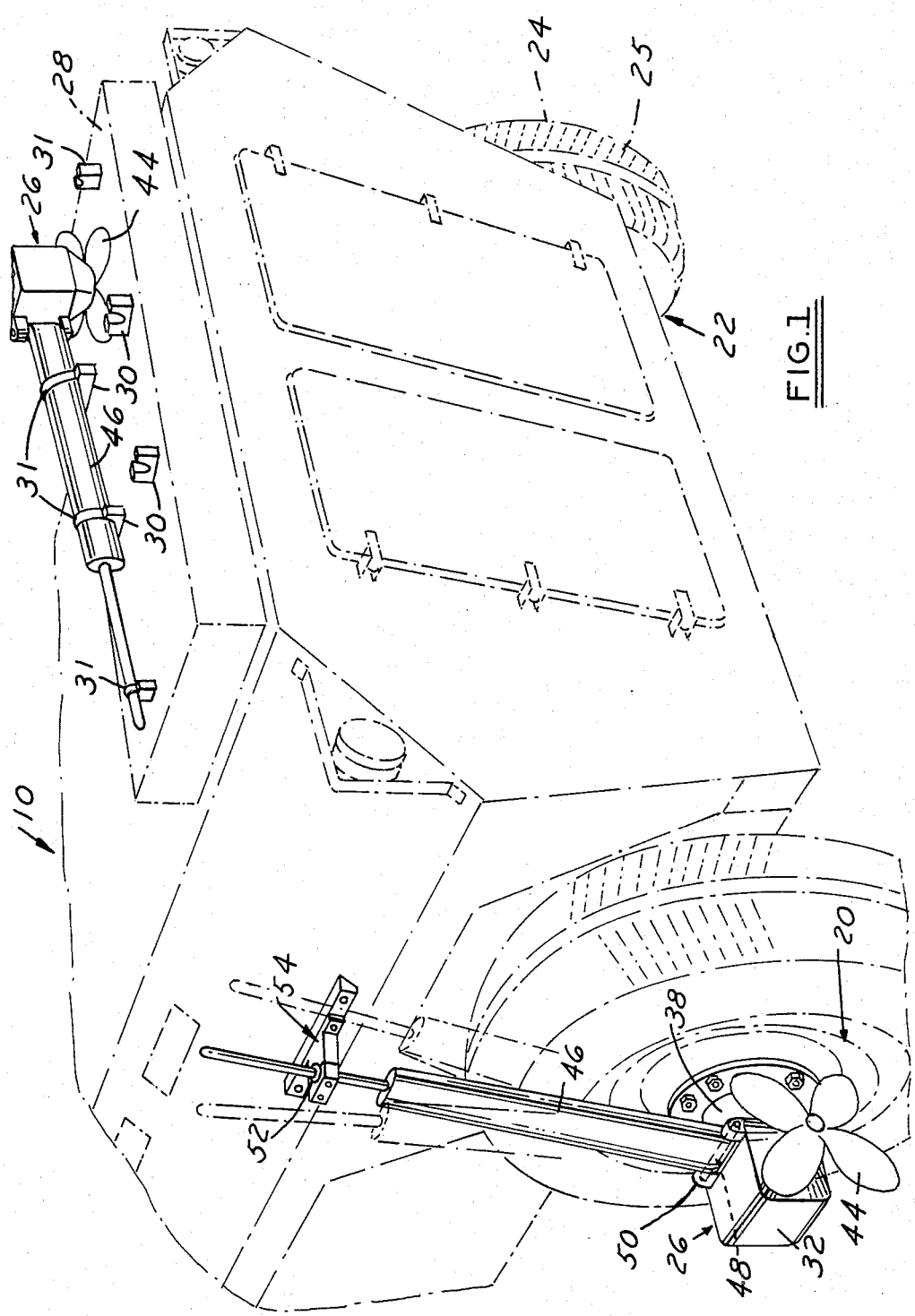

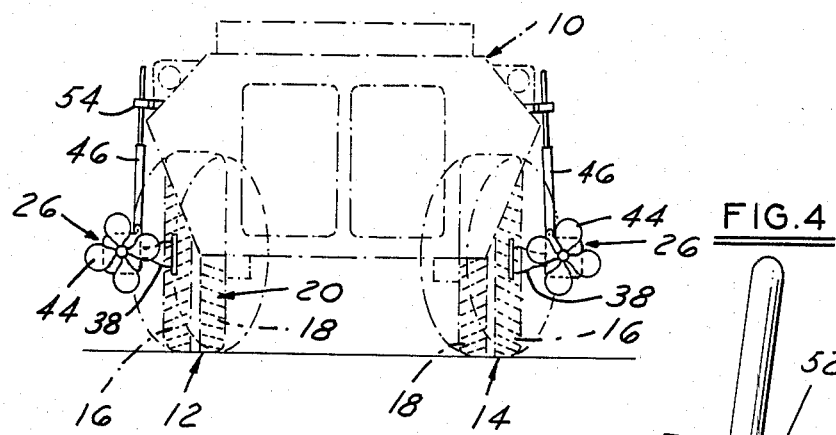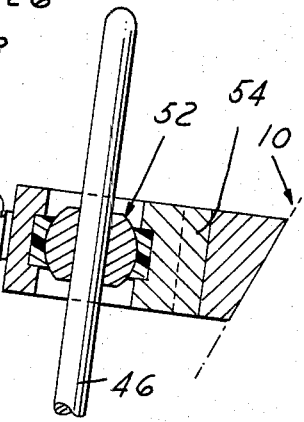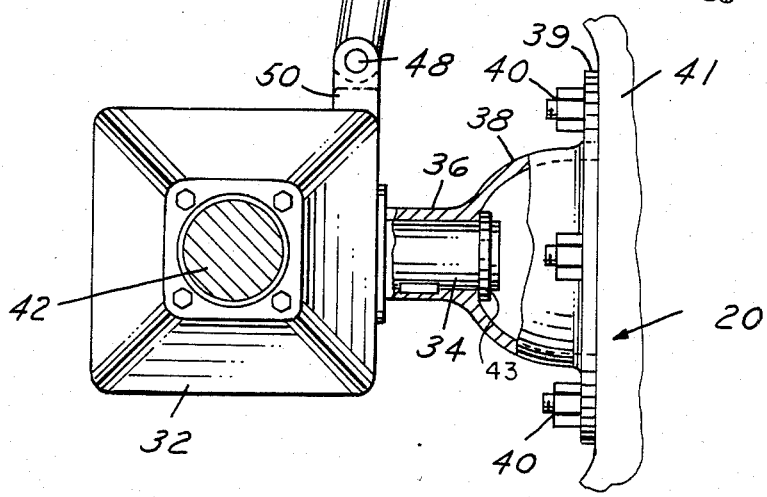

MARINE PROPULSION UNIT

BACKGROUND OF THE INVENTION

This invention relates to propulsion systems for amphibious vehicles and more particularly to propeller propulsion systems for such vehicles.

Amphibious vehicles including armored vehicles of the type set forth in U.S. Pat. No. Des. 195,832 include driven rear wheels with a tread design configured to propel the vehicle when it displaces water of a depth that will float the vehicle. While suitable for the intended purpose, the propulsion provided by such tires at times needs an assist to provide more thrust for propulsion across fast moving bodies of water.

PRIOR ART STATEMENT

U.S. Pat. No. 2,278,215, issued Mar. 31, 1942, discloses an amphibious vehicle with blades 24 connected to the vehicle wheel to propel the vehicle when in a marine mode of operation.

U.S. Pat. No. 3,418,960, issued Dec. 31, 1968, shows an amphibious vehicle with metal wheels with a formed web to assist vehicle propulsion when in a marine mode of operation.

SUMMARY OF THE INVENTION

According to the objects of my invention, an auxiliary propeller assist unit includes improved means directly coupled to the wheel hub of an amphibious vehicle to provide a marine propulsion assist that improves vehicle speed and stability when the amphibious vehicle is operated in a marine mode.

Another object of the present invention is to improve the marine speed of an amphibious vehicle by the provision of a marine propulsion unit for each of a pair of motor driven rear wheels; each auxiliary unit including a gear box with an input connected to wheel hub and an output connected to an outboard propeller and wherein means are provided to hold the gear box and connected propeller in a desired propulsion location.

Still another object is to provide an auxiliary unit of the type set forth in the preceding object wherein the gear box input shaft extends co-axially of a wheel drive shaft and is coupled to a hub extension on the same axis; and wherein the gear box output shaft is arranged at a right angle to the input shaft.

Yet another object is to provide an auxiliary unit of the type set forth in either of the two preceding objects wherein a gear box stabilization strut is connected between the gear box and the vehicle hull to hold the gear box in a fixed relationship to locate the propeller in a desired outboard position of the propeller thrust axis with respect to the vehicle drive wheel.

Another object of the invention is to provide a unit of the two preceding objects wherein the gear box stabilizing means/strut includes a pivotal connection to the gear box and bracket means to slidably support the opposite end to the hull to accommodate wheel suspension movements and wherein the bracket means and wheel connection are releasable to enable the auxiliary unit to be removed from the wheel for stowage on the vehicle when it is operated in a land mode of drive.

Another object of the invention is to provide means that enable the strut to assume positions to change the thrust axis of the propeller to trim its performance.

Other objects and advantages of the invention will be hereafter described or become apparent to those skilled in the art and the novel features will be defined in the appended claims.

The present invention provides an auxiliary, stowable unit that can be attached to the hub of an existing vehicle wheel to assist and enhance the propulsion effect of tire treads on the vehicle wheel. In particular, the auxiliary unit includes a gear box with an input directly coupled to each rear vehicle wheel hub and a right angle output shaft connected to a marine propeller. An anti-torque strut is pivoted at one end to the gear box and slidably mounted to the vehicle hull at its opposite end to hold the gear box in a fixed outboard position to the wheel so as to produce a propeller thrust complementary to and in parallel to the tire tread thrust to produce a stable drive assist when the vehicle is in a marine mode of operation.

BRIEF DESCRIPTION OF THE DRAWINGS

FIG. 1 is a perspective view of the rear of an amphibious vehicle including the present invention;

FIG. 2 is a rear elevational view of the vehicle of FIG. 1 showing two connected units of the present invention; and FIG. 3 is a partially sectioned end view of drive components of the proposed invention; and FIG. 4 is a sectional view taken along the line 4.4 of FIG. 1 looking in the direction of the arrows.

DESCRIPTION

Referring now to FIGS. 1 and 2, a wheeled amphibious vehicle 10 is illustrated. It includes a pair of front wheels 12, 14 connected to suitable steering linkage and shown in a turning position in the rear elevational view of FIG. 1. Each wheel has a tire 16 mounted thereon with a tread 18 that will provide a first drive in both land and marine modes of vehicle operation.

The vehicle 10 further includes a pair of rear drive wheels 20, 22 each with a tire 24 having a tread 25 configured to produce a forward thrusting force during both land and marine modes of vehicle operation. A suitable steering linkage and drive train for such vehicle drive wheel configurations is disclosed in co-pending U.S. patent application Ser. No. 411,152 filed Aug. 25, 1982 assigned to the assignee of this case.

The tires of such vehicles provide a suitable road and off-road drive speed when operated in a land mode.

When the vehicle is operated in certain marine modes its hull displaces water so that the wheels/tires are driven in the water and thereby depend upon the tread depth to propel the vehicle. Such marine operation will propel the vehicle at a water speed which is suitable for certain quiet bodies of water.

In accordance with the present invention, an auxiliary marine propulsion unit 26 is provided for association with each rear drive wheel 20, 22. Each unit 26 is stowable on the vehicle hull 28 by cradles 30 and suitable locking devices 31 when the vehicle is operated on land. While the units 26 are shown associated with rear wheels they can be associated with any pair of driven wheels depending upon the wheel array. For example, in a six-wheel vehicle the units 26 can be connected to the mid wheel set or to the front wheels to assist vehicle steering.

During a marine mode of operation each unit 26 is connected at an outboard position on each of the rear wheels 20, 22 as shown in FIGS. 1-3.

Each unit 26 includes, in one working embodiment, a speed increasing gear box 32 having an input shaft 34 keyed to a tubular end 36 on a bell-shaped outboard hub extension 38. The extension 38 has a flange 39 connected by a ring of bolts 40 to a wheel hub 41. A ring 43 is clamped to the inboard end of shaft 34. The O.D. of ring 43 is greater than the I.D. of end 36 to prevent outboard movement of the shaft 34. The shaft 34 is coaxial of the drive shafts of the wheels 20, 22 as is the extension 38.

The gear box 32 is a right angle drive unit which in one working embodiment increases speed by a 3:1 ratio. The output shaft 42 of each gear box is connected to a drive propeller 44 that is pitched to produce a water propulsion thrust complementary to and parallel to the marine propulsion thrust provided by the tread on the tires of the rear wheels 20, 22. The units 26, however, are equally suitable for association with smooth tread wheels which provide little or no marine propulsion.

An anti-torque strut 46 is connected by a pivot pin 48 to a mounting bracket 50 fixed to the inboard side of the top of gear box 32. A free round end of strut 46 is nested within a ball joint 52 secured by a lock bracket 54 to the hull so that the end of the strut 46 is slidable and pivotable relative to the bracket 54. The pivot connection and sliding action and pivotable ball joint action provide degrees of freedom that will accommodate suspension movements common to vehicles having independently suspended wheel units and several other suspensions without binding the strut 46 at bracket 54. The strut 46 serves to hold the gear box and propeller 44 is a desired marine propulsion position which enhances the drive speed of the vehicle when it crosses rapidly moving bodies of water. Furthermore, the extension 38 can be adjusted angularly by the ring of bolts 40 and the strut 46 will assume either fore or aft positions shown in dotted line in FIG. 1. The lock bracket 54 will be repositioned to hold the strut in such position. Such angular adjustment shifts the thrust axis of the propeller to trim the running attitude (pitch angle) of the hull in order to maximize water speed and/or dryness of the vehicle's top deck.

The units 26 are easily removed from the wheel hubs by disconnecting the ring of bolts 40. Thereafter the units can be stowed on the vehicle hull to protect the propellers when the vehicle is driven over land.

While the specific details of a preferred embodiment are illustrated, changes and alterations may be made without departing from the spirit and scope of the invention.

What is claimed is:

1. A marine propulsion unit for an amphibious vehicle having a hull and a pair of motor driven wheels comprising: a wheel hub extension on each wheel, a gear box with an input connected to each wheel hub extension, said gear box having an outboard propeller connected to face in a direction to enhance marine propulsion, and anti-torque means to hold the gear box and connected propeller in a desired propulsion location, said anti-torque means including a gear box stabilization strut connected between the gear box and the vehicle hull to hold the gear box in a fixed relationship to locate the propeller in a desired outboard marine drive position with respect to the motor driven wheels.

2. In the combination of claim 1, said gear box stabilization strut including a pivotal connection to the gear box, and means to hold the opposite end of said strut to the hull for sliding and pivotal movement relative thereto, said pivotal connection and bracket means defining degrees of freedom to accommodate movements of an independently suspended wheel relative to the vehicle hull.

3. In the combination of claim 2, fastening means for connecting said wheel hub extension for angular movement with respect to the wheel to change the thrust axis of the propeller to trim its performance.

4. In the combination of claim 3, said fastening means including a flange on said hub extension and a ring of connecting bolts adjustable to angularly position the hub extension and gear box with respect to the wheel.

5. In the combination of claim 1, fastening means for connecting said wheel hub extension for angular movement with respect to the wheel to change the thrust axis of the propeller to trim its performance.

6. A marine propulsion unit for an amphibious vehicle having a hull and a pair of motor driven wheels comprising: a wheel drive shaft and a hub extension on each wheel, a gear box with an input shaft connected to each wheel hub extension, said gear box having an output shaft arranged at an angle to the input shaft, an outboard propeller connected to said output shaft to face in a direction to enhace marine propulsion, and anti-torque means to hold the gear box and connected propeller in a desired propulsion location, said gear box input shaft extending co-axially of the wheel drive shaft and coupled to the wheel hub extension on the same axis, said anti-torque means including a gear box stabilization strut connected between the gear box and the vehicle hull to hold the gear box in a fixed relationship to locate said propeller in a desired outboard marine drive position with respect to the motor driven wheels and the floating attitude of the vehicle hull.

7. In the combination of claim 6, fastening means for connecting said wheel hub extension for angular movement with respect to the wheel to change the thrust axis of the propeller to trim its performance.

8. A marine propulsion unit for an amphibious vehicle having a hull and a pair of motor driven wheel comprising: a wheel hub extension on each wheel, a gear box with an input shaft connected to each hub extension, said gear box having an outboard propeller connected to face in a direction to enhance marine propulsion, anti-torque means to hold the gear box and connected propeller in a desired propulsion location, fastening means for connecting said wheel hub extension for angular movement with respect to the wheel to change the thrust axis of the propeller to trim its performance, said fastening means including a flange on said hub extension and a ring of connecting bolts adjustable to angularly position the hub extension and gear box with respect to the wheel.

* * * * *